United States Patent
Sharma et al.

(10) Patent No.: US 9,136,698 B2
(45) Date of Patent: Sep. 15, 2015

(54) POWER SUPPLY SELECTOR AND METHOD FOR MINIMIZING AN INRUSH CURRENT IN A POWER SUPPLY SELECTOR

(75) Inventors: Anmol Sharma, Freising (GE); Pavan Kumar Bandarupalli, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 888 days.

(21) Appl. No.: 13/328,969

(22) Filed: Dec. 16, 2011

(65) Prior Publication Data

US 2012/0228962 A1 Sep. 13, 2012

(30) Foreign Application Priority Data

Mar. 10, 2011 (DE) ...................... 10 2011 013 529.4

(51) Int. Cl.
*H02B 1/24* (2006.01)
*H02H 9/00* (2006.01)

(52) U.S. Cl.
CPC ............. *H02H 9/001* (2013.01); *Y10T 307/747* (2015.04)

(58) Field of Classification Search
USPC ........... 307/113, 112, 31, 33, 35, 38, 39, 116, 307/80, 81; 361/87, 91.1, 93.2, 93.8, 98, 361/435; 323/908, 282; 326/83, 62, 82
See application file for complete search history.

(56) References Cited

U.S. PATENT DOCUMENTS

| | | | | |
|---|---|---|---|---|
| 7,626,524 B2* | 12/2009 | Horie | ............................. | 341/141 |
| 7,813,098 B2* | 10/2010 | Mayell | .......................... | 361/93.9 |
| 8,233,256 B2* | 7/2012 | Mehas et al. | .................. | 361/93.2 |
| 2002/0113270 A1* | 8/2002 | Bernstein et al. | ............. | 257/369 |
| 2004/0217653 A1* | 11/2004 | Neidorff | .......................... | 307/80 |
| 2006/0114624 A1* | 6/2006 | Sharma | .......................... | 361/18 |
| 2006/0145673 A1* | 7/2006 | Fogg et al. | ..................... | 323/282 |
| 2006/0250183 A1* | 11/2006 | Zhao et al. | ..................... | 330/251 |
| 2007/0018502 A1* | 1/2007 | Bazinet | ............................ | 307/80 |
| 2008/0048722 A1* | 2/2008 | Suzuki | ............................ | 326/83 |
| 2009/0278571 A1* | 11/2009 | Pietri et al. | ....................... | 327/50 |
| 2010/0052656 A1* | 3/2010 | Tanaka et al. | ............. | 324/123 R |
| 2011/0068829 A1* | 3/2011 | Ogawa et al. | .................... | 327/64 |
| 2012/0025805 A1* | 2/2012 | Matsushita et al. | ......... | 324/76.11 |
| 2012/0319484 A1* | 12/2012 | Scaldaferri et al. | ............. | 307/52 |

FOREIGN PATENT DOCUMENTS

DE 10 2009 007 969 A1 8/2010

OTHER PUBLICATIONS

Ahmed et al. "Design of a Linearly Increasing Inrush Current Limit Circuit for DC-DC Boost Regulators", Circuits and Systems (APC-CAS), 2010, pp. 863-866, IEEE Asia Pacific Conference.

* cited by examiner

*Primary Examiner* — Jared Fureman
*Assistant Examiner* — Carlos Laguerre
(74) *Attorney, Agent, or Firm* — John R. Pessetto; Charles A. Brill; Frank D. Cimino

(57) ABSTRACT

A method for minimizing an inrush current in a power supply selector and a power supply selector system is provided. The power supply selector includes a plurality of power input nodes, a power output node, a first transistor and a second transistor. Each of the power input nodes may be coupled to a first switch having a first on-resistance and to a second switch having a second on-resistance. The second on-resistance is greater than the first on-resistance. The first switch and the second switch are preferably coupled in parallel. The power supply selector may be configured to couple a selected one of the power input nodes to the source of the first transistor and to the gate of the second transistor so as to sense a sense voltage at the selected power input node.

5 Claims, 3 Drawing Sheets

POWER SUPPLY SELECTOR AND METHOD FOR MINIMIZING AN INRUSH CURRENT IN A POWER SUPPLY SELECTOR

FIELD OF THE INVENTION

The invention relates to a power supply selector comprising a plurality of power input nodes and further to a method for minimizing an inrush current in a power supply selector.

BACKGROUND

Inrush currents or input surge currents are maximum instantaneous input currents drawn by an electrical device during power-up or when switching to another power source. Inrush currents may be several times the normal full load current and accordingly an overcurrent protection of the respective electrical or electronic device has to be provided. The overcurrent protection has to react quickly to the overload.

FIG. 1 is a simplified circuit diagram of a power supply selector 2 having a plurality of input nodes having input voltages VIN1, VIN2 and VIN3. In principal, there may be an arbitrary number of input nodes VIN1 to VINX. The power supply selector 2 is provided with an inrush current protection by applying a window comparator 4 comprising a first comparator CMP1 and a second comparator CMP2. Each of the power input nodes VIN1 to VIN3 of the power supply selector 2 is coupled to a first switch 6 having a first on-resistance and a second switch 8 having a second on-resistance. The first and the second switch 6, 8 are coupled in parallel. The on-resistance of the first switch 6 is lower than the on-resistance of the second switch 8. The first and second switch 6, 8 are further coupled to an output node having an output voltage VOUT1 for providing a system power source. Depending on whether one of the switches (i.e. the first switch 6 or the second switch 8) that is coupled to a respective one of the power input nodes VIN1 to VIN3 is opened or closed, the power output node VOUT1 is connected to one of the respective input sources VIN1 to VIN3.

The respective input source is selected by setting a power source select node VSEL1 from low to high. Accordingly, the second switch 8 having the higher on-resistance is closed. Preferably, the first and second switch 6, 8 is provided by suitable transistors, e.g. MOSFETs, having a different gate width. Since the on-resistance of the second switch 8 is comparably high, the inrush current is minimized due to its high resistance. However, the high on-resistance of the second switch 8 causes high losses and therefore it is not suitable for continuous operation. It is therefore desired to switch, i.e. to close, the first switch 6 having a low on-resistance in order to minimize these losses. However, if a peak current or inrush current is detected, the first switch 6 has to be opened in order to minimize the inrush current.

Inrush current protection is typically provided by sensing a voltage difference between the respective input node, i.e. by sensing one of VIN1 to VIN3 and the voltage VOUT1 at the power output node. According to the prior art, this is achieved by applying a window comparator 4. A selected one of the power input nodes VIN1 to VIN3 is coupled to the inverting terminal of the first comparator CMP1 and to the non-inverting terminal of the second comparator CMP2. This sense voltage VSENSE is compared to the voltage VOUT1 at the output node by coupling the output node to the non-inverting terminal of the first comparator CMP1 and to the inverting terminal of the second comparator CMP2. The output terminal of the first and second comparator CMP1, CMP2 as well as the inverted power source select signal VSEL1 (inverted by inverter 10) are coupled to the input nodes of a NOR-gate 12. According to the commonly known truth table of the NOR-gate, the output terminal thereof provides a switching signal SW opening the first switch 6 if either the output of the first comparator CMP1 or the second comparator CMP2 is set to high. This means that the difference between the sense voltage VSENSE and the output voltage VOUT1 is greater than a predetermined threshold value. According to the example in FIG. 1, this threshold value is near or equal to zero and the first switch 6 is opened, if the two voltages VSENSE and VOUT1 are not equal to each other. Obviously, the first switch 6 is also opened if the power supply select signal VSEL1 is set to low and accordingly the inverted power source select signal is high.

However, inrush current protectors according to the prior art have a large footprint since two comparators have to be implemented.

SUMMARY

It is an object of the invention to provide a power supply selector and a method for minimizing an inrush current in a power supply selector that are improved with respect to the space requirements or footprint while maintaining the requirements of fast response time and reliable overcurrent protection.

In an aspect of the invention, a power supply selector comprising a plurality of power input nodes, a power output node, a first transistor and a second transistor is provided. Each of the power input nodes may be coupled to a first switch having a first-on resistance and to a second switch having a second on-resistance. The second on-resistance is greater than the first on-resistance and the first switch and the second switch are coupled in parallel.

The power supply selector according to an aspect of the invention may be configured to couple a selected one of the power input nodes to the source of the first transistor and to the gate of the second transistor so as to sense (or tap) a sense voltage at the selected power input node. The power supply selector can be further configured to couple the power output node to the gate of the first transistor and to the source of the second transistor so as to sense (or tap) an output voltage of the power output node. Further, the drain of the first transistor and the drain of the second transistor may be coupled to a common switching line for providing a switching signal indicative of a switching status of the first switch.

Advantageously,—when compared to prior art solutions— each comparator gets replaced by just one transistor. This significantly reduces the footprint of the inrush current protection circuit of the power supply selector. For inrush current protection, a voltage at a selected one of the power input nodes and a voltage at the power output node are compared. Each comparison may be performed by utilizing the gate source voltage characteristic of a transistor. Advantageously, the power supply is more variable and has a reduced footprint, when compared to the comparator solution known in the prior art. Further, extremely low input bias currents and little power losses during continuous operation may be achieved. After the supply transient has settled, a supply current may be provided mainly by the first switch having a small on-resistance.

In an embodiment of the invention, the switching line can be coupled to the gate of the first switch and the power supply selector may be configured to switch off the first switch if the switching signal is in a high state.

In normal operation of the power supply selector, both, the first transistor is in its OFF-state and the second transistor is in its OFF-state. Advantageously, the power supply selector does not consume any static current. A possible current sink is automatically switched off because the only current path that could serve as a current sink leads through the first transistor or through the second transistor. Because both transistors are in their OFF-state, the power supply selector offers zero static power consumption.

In another aspect of the invention, the power supply selector may be further configured to set the switching signal to the high state, if a difference between the sense voltage and the output voltage exceeds a predetermined threshold voltage. Preferably, the threshold voltage is the gate source threshold voltage of the first or the second transistor. Advantageously, a suitable threshold voltage for the power supply selector may be selected in that a suitable transistor type for the first transistor and the second transistor is selected. By selecting different types of transistors for the first transistor and the second transistor, i.e. transistors having a different gate-to-source threshold voltage, also an asymmetric behavior of the overcurrent protection circuit may be provided. This means that a positive or negative deviation between the output voltage of the power supply selector and the input voltage of the selected input node are detected with respective different threshold voltages.

In an advantageous embodiment, the power supply selector further comprises a NOR-gate and an inverter. A power source select node for receiving a power source select signal may be coupled to an input of the inverter and the inverted power source select signal that is present at the output of the inverter may be coupled to a first input node of the NOR-gate. The second input node of the NOR-gate can be coupled to the switching line for providing a switching signal indicative to the selected one of the power input sources. An output node of the NOR-gate may be coupled to the gate of the first switch so as to change a switching status of the first switch.

In another aspect of the invention, a method for minimizing an inrush current in a power supply selector is provided. The power supply selector comprises a plurality of input nodes, a power output node, a first transistor and a second transistor. Each of the power input nodes may be coupled to a first switch having a first on-resistance and to a second switch having a second on-resistance. The second on-resistance is greater than the first on-resistance. Preferably, the first switch and the second switch are coupled in parallel. A selected one of the power input nodes is coupled to the source of the first transistor and to the gate of the second transistor for sensing a sense voltage at a selected one of the power input nodes. In another step, the power output node may be coupled to the gate of the first transistor and to the source of the second transistor for sensing an output voltage at the power output node. Further, the drain of the first transistor and the drain of the second transistor may be coupled to a common switching line. The first switch may be switched off if, a difference between the sense voltage and the output voltage exceeds a predetermined threshold voltage. According to an aspect of the invention, the predetermined threshold voltage is the gate source threshold voltage of the first transistor and the second transistor, respectively.

Same or similar advantages that have been already mentioned for the power supply selector according to aspects of the invention apply to the method according to aspects of the invention.

According to another aspect of the invention, a power supply selector system is provided. The power supply selector system comprises a plurality of power supply units. Each power supply unit preferably has a plurality of power input nodes and a power output node. For each of the power input nodes, a first switch having a first on-resistance and a second switch having a second on-resistance may be provided. The second on-resistance is greater than the first on-resistance and the first switch and the second switch may be coupled in parallel.

Preferably, the power supply selector system further comprises a first transistor, a second transistor and a third transistor. The first power supply selector unit may be configured to couple a selected one of the power input nodes to the source of the first transistor and to the gate of the second transistor for sensing a sense voltage at a selected power input node. Further, the first power supply selector unit may be configured to couple the power output node to the gate of the first transistor, to the source of the second transistor and to the source of the third transistor for sensing an output voltage at the power output node.

The second power supply selector unit may be configured to couple the power output node to the gate of the third transistor for sensing the output voltage at the output node.

The power supply selector system according to aspects of the invention may be further configured to couple the drain of the first transistor, the drain of the second transistor and the drain of the third transistor to a common switching line. This is for providing a switching signal that is indicative to a switching signal of the big switch of the first power supply unit.

Advantageously, the power supply selector system according to aspects of the invention does not only provide an overcurrent protection that is based on a measurement, i.e. a comparison, between the input voltage of a selected one of the input nodes and the output voltage at a power output node but also takes into account the output voltage of a second or a further power supply selector unit. Advantageously, the reliability and security of the inrush current protection may be improved.

BRIEF DESCRIPTION OF DRAWINGS

Further aspects of the invention will ensue from the following description of an example embodiment of the invention with reference to the accompanying drawings, wherein.

DETAILED DESCRIPTION OF AN EXAMPLE EMBODIMENT

Figure 1:
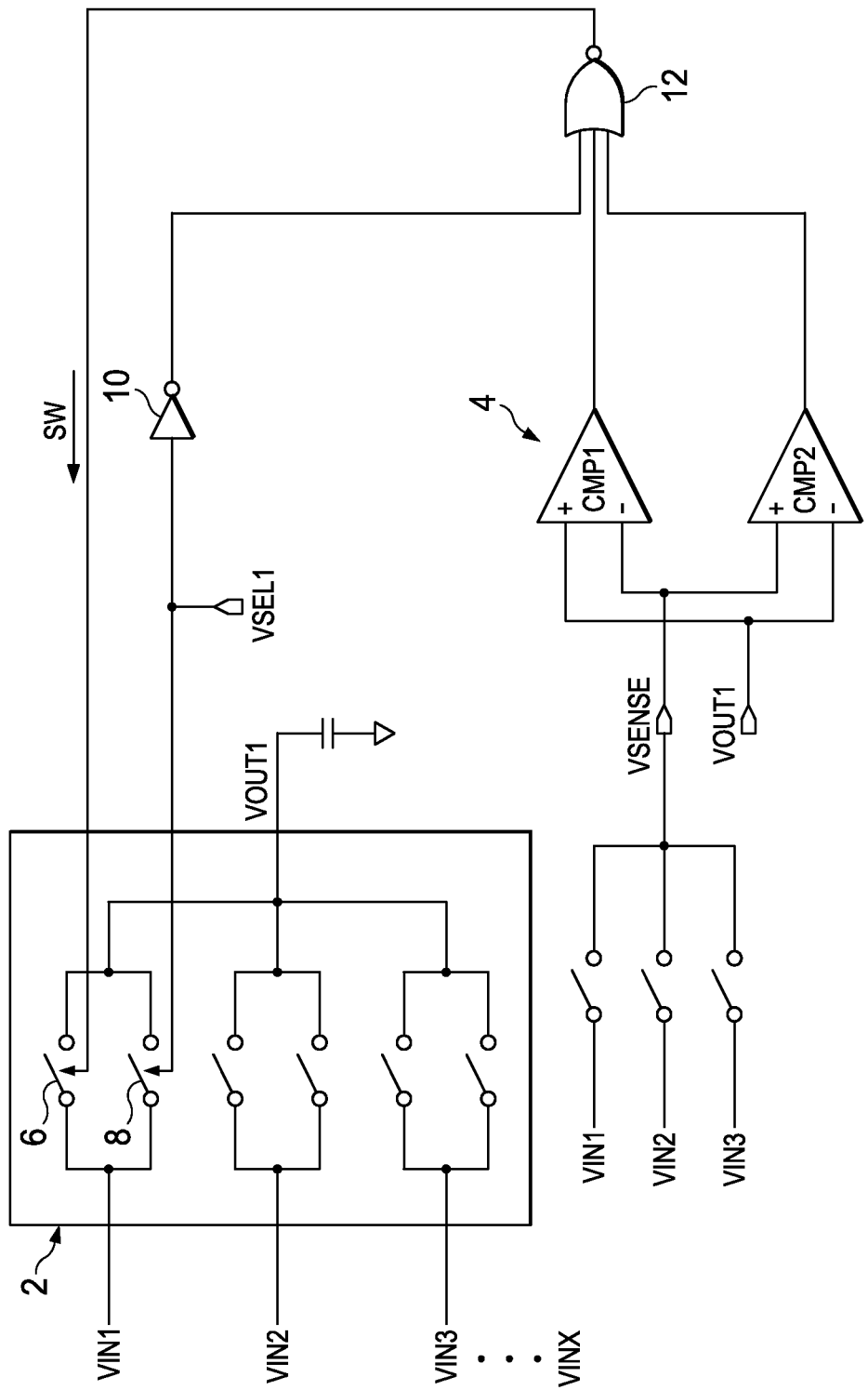
FIG. 1 is a simplified circuit diagram for a power supply selector having an inrush current protection according to the prior art.
Figure 2:
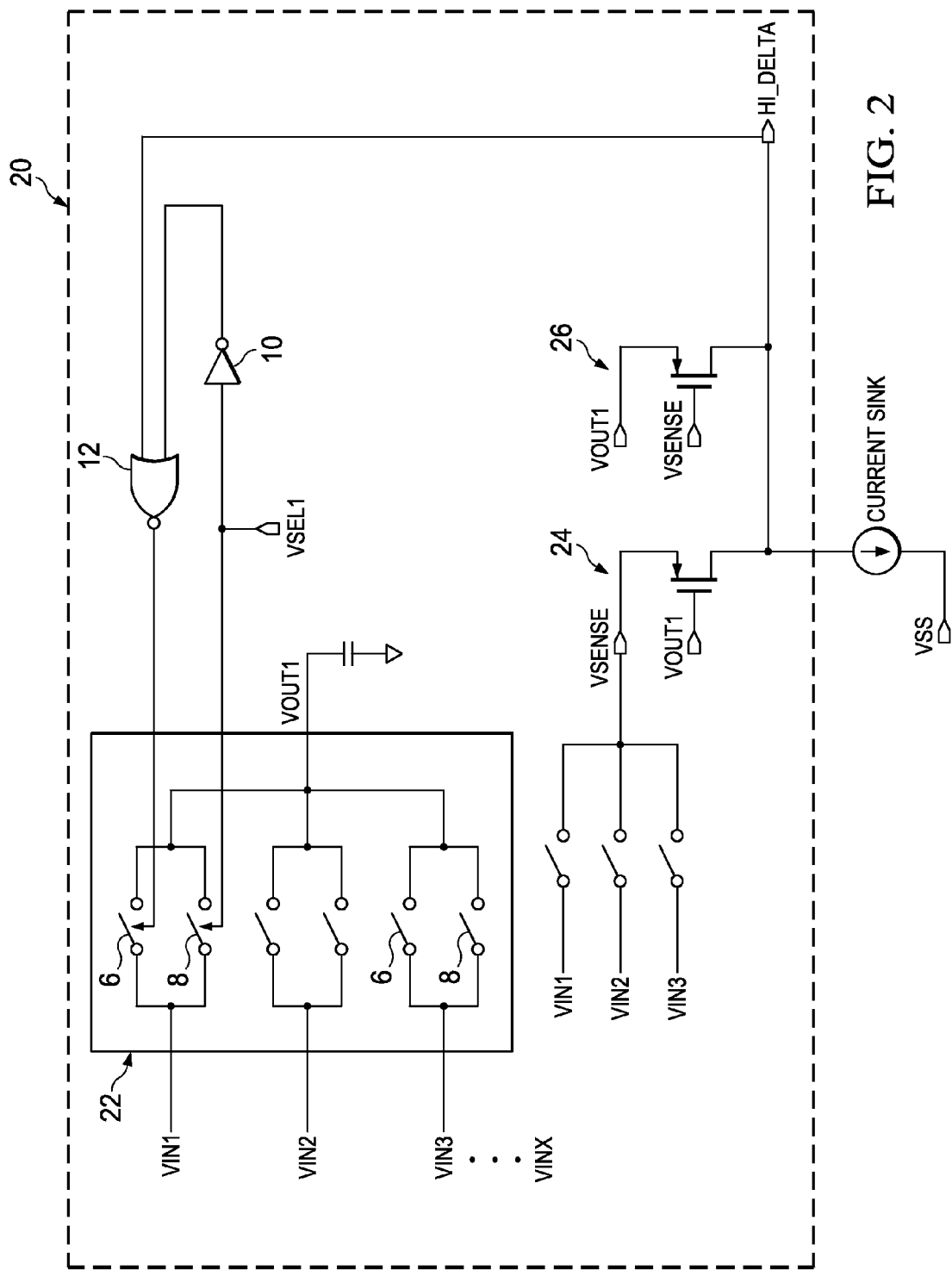
FIG. 2 is a simplified circuit diagram for a power supply selector according to an embodiment of the invention and FIG. 3 is a simplified circuit diagram for a power supply selector system according to an embodiment of the invention.

FIG. 2 is simplified circuit diagram of a first embodiment. There is a power supply selector 20 comprising a power supply selector unit 22 having a plurality of power input nodes for input voltages VIN1 to VIN3. The respective power input nodes are identified by their respective input voltage VIN1 to VIN3. The power supply selector unit 22 may also provide an arbitrary number of power input nodes VIN1 to VINX. Each of the power input nodes VIN1 to VIN3 is coupled to a first switch 6 having a first on-resistance and to a second switch 8 having a second on-resistance, wherein the first on-resistance is smaller than the second on-resistance. Preferably, the first on-resistance is significantly smaller than the second on-resistance. The first switch 6 and the second switch 8 are coupled in parallel. A first side of the switches 6, 8 is coupled to the respective power input node VIN1 to VIN3 and a second side of the switches 6, 8 is coupled to a power output node having an output voltage VOUT1. The power output node is identified by its output voltage VOUT1.

For selection of a respective power input source VIN1 to VIN3, a power source select node is set from low to high. By way of an example only, the first power input source VIN1 is selected by setting the first power source select node VSEL1 from low to high. A power source select node VSEL1 is shown for the first power input node VIN1 only. However, the further power input nodes VIN2 to VIN3 are provided with respective power source select nodes. The second switch 8 has a higher on-resistance than the first switch 6. Preferably, suitable transistors e.g. MOSFETS are used for the first and second switch 6, 8. The respective on-resistance may be due to a different gate width of the respective transistors. If, for example, the power source select node VSEL1 is set from low to high, the second switch 8 is closed.

In order to provide an inrush current or overcurrent protection to a system that is supplied with the output current having the output voltage VOUT1, a first transistor 24 and a second transistor 26 are provided. The transistors 24, 26 are part of the power supply selector 20. Preferably, MOSFETS, BJTs, JFETs. may be used as transistors 24, 26. A selected one of the power input nodes VIN1 to VIN3, or more specifically the voltage of the input nodes VIN1, VIN2 or VIN3, is coupled as the sense voltage VSENSE to the source of the first transistor 24. If the first power source select node VSEL1 is selected, the sense voltage VSENSE is equal to VIN1. Furthermore, the sense voltage VSENSE is applied to the gate of the second transistor 26. The output voltage VOUT1, however, is applied to the first and second transistor 24, 26 vice versa. In other words, the output voltage VOUT1 is applied to the gate of the first transistor 24 and to the source of the second transistor 26. The drain of the first transistor 24 and the drain of the second transistor 26 are coupled to a common switching line providing a switching signal HI_DELTA. The switching line is coupled to a current sink and further to ground node VSS.

The first transistor 24 and the second transistor 26 have their specific gate to source threshold voltage. If, for at least one of the two transistors 24, 26, the threshold voltage is exceeded, the respective transistor 24, 26 is switched into its ON-state and the common switching line, i.e. the switching signal HI_DELTA, is set from low to high.

If the sense voltage VSENSE is below the output voltage VOUT1 the first transistor 24 is in its OFF-state. The difference between the output voltage VOUT1 and the sense voltage VSENSE has to exceed the gate source threshold voltage of the first transistor 24, in order to switch this transistor into its ON-state. However, exemplarily, the sense voltage VSENSE should remain below the output voltage VOUT1. This means, on the other hand, that the output voltage VOUT1 is greater than the sense voltage VSENSE. If the difference between the sense voltage VSENSE and the output voltage VOUT1 exceeds the gate to source threshold voltage of the second transistor 26, this transistor 26 is set to its ON-state. Accordingly, the switching signal HI_DELTA is high. If the sense voltage VSENSE increases and the difference between the sense voltage VSENSE and the output voltage VOUT1 is below the threshold voltage of the second transistor 26, this transistor is switched off and accordingly the switching signal HI_DELTA is set to low.

The power supply selector signal VSEL1 is set to high if the respective power source is selected. Here, the power source at the input node VIN1 is selected. The inverter 10 inverts the power source select signal and accordingly a low signal is applied to the NOR-gate 12. If the signal HI_DELTA is also at low state (as previously described), the output of the NOR-gate is high and the first switch 6 is turned on. Preferably, the output line of the NOR-gate 12 is coupled to the gate of a MOSFET providing the first switch 6. Now, the first switch 6 the second switch 8 are both closed and coupled in parallel and accordingly a very low power loss is present in the power supply selector unit 22.

In normal operation of the power supply selector when both, the first transistor 24 and the second transistor 26 are OFF, the power supply selector does not consume any static current. A possible current sink is automatically switched OFF because the only current path to serve as a current sink is through the first transistor 24 or through the second transistor 26. Because both switches are in their OFF-state, the power supply selector has zero static power consumption.

If the sense voltage VSENSE increases further and reaches the output voltage VOUT1, both the first transistor 24 and the second transistor 26 will remain in their OFF-state until the difference between the sense voltage VSENSE and the output voltage VOUT1 exceeds, e.g. due to variations in the input power supply coupled to the respective power input node VIN1, the gate source threshold voltage of the first transistor 26. If the sense voltage VSENSE exceeds this value, the first transistor 24 is set to its ON-state and accordingly the common sense line provides a sense signal HI_DELTA that is high.

Now, the NOR-gate 12 outputs a low signal and switches off the first switch 6. The inverted power source select signal VSEL1 is still low, however, the sense signal HI_DELTA is high. According to the known truth table of the NOR-gate, its output is set to low. Therefore, the power output node VOUT1 is merely provided with a current via the second switch 8 having a significantly higher on-resistance than the first switch 6. This means that an overcurrent protection is provided and the inrush current may be minimized, effectively.

In another embodiment of the invention (not shown), the NOR-gate 12 and the inverter 10 may be replaced by a suitable state machine providing a suitable switching signal to the first switch 6. The switching signal HI_DELTA may then be one input for the sate machine while the power source select signal VSEL1 may be the other input signal. Accordingly, the output of the state-machine would be high, if the power source select signal VSEL1 is high and the switching signal HI_DELTA is low.

In other words, as long as the input voltage VSENSE is located inside a window being defined by the output voltage VOUT1 plus and minus the gate source threshold voltage of the first transistor 24 and the second transistor 26, respectively, power is supplied to the power output node VOUT1 via the first switch 6. If the voltage at the power output node VOUT1 exceeds this predetermined window, there is a significant probability for an inrush current. This inrush current is minimized by switching off the first switch 6 having the lower resistance and by supplying power via the second switch 8 only.

Figure 3:
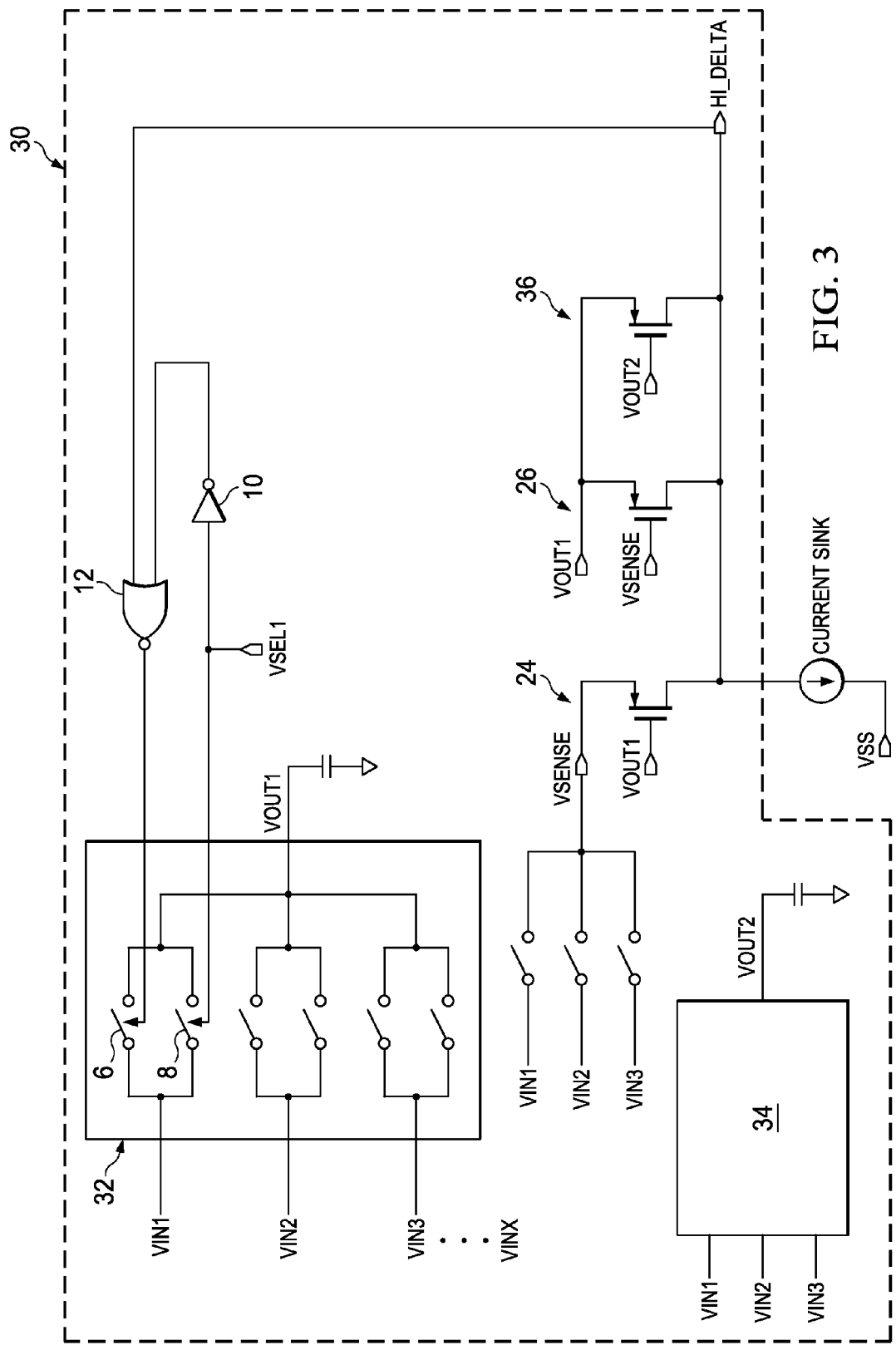

FIG. 3 is a simplified circuit diagram according to another embodiment of the invention. There is a power supply selector system 30 comprising a first power supply selector unit 32 and a second power supply selector unit 34. The power supply selector system 30 comprises a first transistor 24 and a second transistor 26 which are coupled to the first power input unit 32 in a similar manner as previously described and shown in FIG. 2.

However, the power supply selector system 30 further comprises a third transistor 36, wherein the source of the third transistor 36 is coupled to the output node VOUT1 of the first power supply selector unit 32 and the gate of the third transistor 36 is coupled to the power output node VOUT2 of the second power supply selector unit 34. The drain of the third transistor is coupled to the common sense line together with the drains of the first and second transistor 24, 26. Accordingly, the switching signal HI_DELTA is set to high and the first switch 6 of the first power supply selector unit 32 is switched off, if the output voltage VOUT1 of the first power supply selector unit 32 exceeds the output voltage VOUT2 of the second power supply selector unit 34 by a gate source threshold voltage of the third transistor 36. The second power supply selector unit 34 is comparable to the first power supply selector unit 32. The respective switches 6 and 8 (similar to those of the first power supply selector unit 32) are also present but not shown in FIG. 3.

The power supply selector system 30 allows watching the difference between the output voltage VOUT1 and the input voltage VIN1 to VIN3 of the first power supply selector unit 32 as well as watching the output voltage VOUT2 of the second power supply selector unit 34. Accordingly, the inrush current protection is not limited to one power supply selector unit but takes into account the interaction and interplay between different power supply selector units 32, 34.

The power supply selector system 30 may be easily upgraded to more than two power supply selector units by adding respective transistors that are coupled to the output voltage VOUT1 of the first power supply selector unit and a respective output voltage of the additional power supply selector unit.

Although the invention has been described hereinabove with reference to specific embodiments, it is not limited to these embodiments and no doubt further alternatives will occur to the skilled person that lie within the scope of the invention as claimed.

The invention claimed is:

1. A power supply selector, comprising: a plurality of power input nodes, a power output node, a first transistor and a second transistor, wherein each of the plurality of power input nodes is coupled to a first switch having a first on-resistance and to a second switch having a second on-resistance, wherein the second on-resistance is greater than the first on-resistance, and wherein the first switch and the second switch are coupled in parallel, wherein
the power supply selector is configured to couple a selected one of the power input nodes to a source of the first transistor and to a gate of the second transistor so as to sense a sense voltage at the selected one of the power input nodes, and wherein
the power supply selector is configured to couple the power output node to a gate of the first transistor and to a source of the second transistor so as to sense an output voltage at the power output node, and wherein
a drain of the first transistor and a drain of the second transistor is coupled to a common switching line for providing a switching signal indicative of a switching status of the first switch;
wherein the common switching line is coupled to a gate of the first switch, and wherein the power supply selector is configured to switch-off the first switch, if the switching signal is in a high state.

2. The power supply selector according to claim 1, wherein the power supply selector is further configured to set the switching signal to the high state, if a difference between the sense voltage and the output voltage exceeds a predetermined threshold voltage.

3. The power supply selector according to claim 2, wherein the predetermined threshold voltage is a gate-source threshold voltage of the first transistor or of the second transistor.

4. A method for minimizing an inrush current in a power supply selector, the power supply selector comprising: a plurality of input nodes, a power output node, a first transistor and a second transistor, wherein each of the plurality of power input nodes is coupled to a first switch having a first on-resistance and to a second switch having a second on-resistance, wherein the second on-resistance is greater than the first on-resistance, and wherein the first switch and the second switch are coupled in parallel, the method comprising the steps of:
a) coupling a selected one of the plurality of power input nodes to a source of the first transistor and to a gate of the second transistor so as to sense a sense voltage at the selected one of the plurality of power input nodes,
b) coupling the power output node to a gate of the first transistor and to a source of the second transistor so as to sense an output voltage at the power output node,
c) coupling a drain of the first transistor and a drain of the second transistor to a common switching line and
d) switching off the first switch, if a difference between the sense voltage and the output voltage exceeds a predetermined threshold voltage.

5. A power supply selector system, comprising: a plurality of power supply selector units, each having:
e) a plurality of power input nodes, a power output node and for each of the plurality of power input nodes: a first switch having a first on-resistance and a second switch having a second on-resistance, wherein the second on-resistance is greater than the first on-resistance, and wherein the first switch and the second switch are coupled in parallel,
the power supply selector system further comprising: a first transistor, a second transistor and a third transistor, wherein
a first power supply selector unit is configured to:
f) couple a selected one of the plurality of power input nodes to a source of the first transistor and to a gate of the second transistor so as to sense a sense voltage at the selected power input node,
g) couple the power output node to a gate of the first transistor, to a source of the second transistor and to a source of the third transistor so as to sense an output voltage at the power output node, wherein
a second power supply selector unit is configured to:
h) couple the power output node to a gate of the third transistor so as to sense the output voltage at the output node,
wherein the power supply selector system is further configured to
i) couple a drain of the first transistor, a drain of the second transistor and a drain of the third transistor to a common switching line for providing a switching signal indicative of a switching status of the first switch of the first power supply unit.

* * * * *